United States Patent
Lee

(10) Patent No.: US 10,186,142 B2
(45) Date of Patent: Jan. 22, 2019

(54) SYSTEM FOR DETECTING INTRUSION IN ADVANCE USING SMS NOTIFICATION SERVICE AND SYSTEM AND METHOD FOR NOTIFYING RESCUE SIGNAL

(71) Applicant: CRISIS MANAGEMENT SYSTEM, Anyang-si, Gyeonggi-do (KR)

(72) Inventor: Hyung Gin Lee, Anyang-si (KR)

(73) Assignee: CRISIS MANAGEMENT SYSTEM, Anyang-si, Gyeonggi-do (KR)

( * ) Notice: Subject to any disclaimer, the term of this patent is extended or adjusted under 35 U.S.C. 154(b) by 0 days.

(21) Appl. No.: 15/553,010

(22) PCT Filed: Jan. 19, 2016

(86) PCT No.: PCT/KR2016/000551
§ 371 (c)(1),
(2) Date: Aug. 23, 2017

(87) PCT Pub. No.: WO2016/137118
PCT Pub. Date: Sep. 1, 2016

(65) Prior Publication Data
US 2018/0033289 A1    Feb. 1, 2018

(30) Foreign Application Priority Data

Feb. 23, 2015 (KR) .................. 10-2015-0025465
Feb. 23, 2015 (KR) .................. 10-2015-0025468

(51) Int. Cl.
G08B 27/00     (2006.01)
G08B 25/08     (2006.01)
(Continued)

(52) U.S. Cl.
CPC ............ *G08B 27/00* (2013.01); *G08B 13/19* (2013.01); *G08B 13/26* (2013.01); *G08B 25/08* (2013.01);
(Continued)

(58) Field of Classification Search
CPC .......... G08B 1/08; G08B 21/00; G08B 27/00; G08B 7/06; G08B 13/19; G08B 13/26; G08B 25/10; H04W 4/14; H04N 5/225
(Continued)

(56) References Cited

U.S. PATENT DOCUMENTS 7,589,630 B2 * 9/2009 Drake .................. G01F 15/063
                                                    340/539.26
9,595,072 B2 * 3/2017 Fan ...................... G06Q 10/107
(Continued)

FOREIGN PATENT DOCUMENTS

KR    10-2007-0077695 A    7/2007
KR    10-2010-0082904 A    7/2010
(Continued)

*Primary Examiner* — Hung T Nguyen
(74) *Attorney, Agent, or Firm* — Novick, Kim & Lee, PLLC; Jae Youn Kim

(57) ABSTRACT

The present invention relates to a system for detecting intrusion in advance using an SMS notification service and a system and a method for notifying a rescue signal, and more particularly, to a system for detecting intrusion in advance using an SMS notification service capable of promptly notifying a situation by transmitting an SMS notification message to a user terminal of a pre-registered recipient while promptly displaying a warning light and propagating an alarm sound to the outside in an emergency situation, and a system and a method for notifying a rescue signal.

4 Claims, 4 Drawing Sheets

(51) Int. Cl.
- *G08B 13/19* (2006.01)
- *G08B 13/26* (2006.01)
- *G08B 25/10* (2006.01)
- *H04W 4/14* (2009.01)
- *G08B 13/00* (2006.01)
- *H04W 4/12* (2009.01)
- *H04W 4/90* (2018.01)
- *G08B 7/06* (2006.01)

(52) U.S. Cl.
CPC .............. *G08B 25/10* (2013.01); *H04W 4/14* (2013.01); *G08B 7/06* (2013.01); *G08B 13/00* (2013.01); *G08B 27/005* (2013.01); *H04W 4/12* (2013.01); *H04W 4/90* (2018.02)

(58) Field of Classification Search
USPC ......... 340/539.11, 539.23, 540, 545.1, 545.3
See application file for complete search history.

(56) References Cited

U.S. PATENT DOCUMENTS

| | | | | |
|---|---|---|---|---|
| 2002/0118107 | A1* | 8/2002 | Yamamoto | G08B 13/19645 340/541 |
| 2012/0313781 | A1* | 12/2012 | Barker | G08B 13/19656 340/540 |
| 2016/0234232 | A1* | 8/2016 | Poder | H04L 63/1425 |

FOREIGN PATENT DOCUMENTS

| | | |
|---|---|---|
| KR | 10-2010-0097849 A | 9/2010 |
| KR | 10-1186635 B1 | 9/2012 |
| KR | 10-2013-0046787 A | 5/2013 |
| KR | 10-1262355 B1 | 5/2013 |
| KR | 10-1350820 B1 | 1/2014 |

\* cited by examiner

SYSTEM FOR DETECTING INTRUSION IN ADVANCE USING SMS NOTIFICATION SERVICE AND SYSTEM AND METHOD FOR NOTIFYING RESCUE SIGNAL

TECHNICAL FIELD

The present invention relates to a system for detecting intrusion in advance using an SMS notification service and a system and a method for notifying a rescue signal, and more particularly, to a system for detecting intrusion in advance using an SMS notification service capable of promptly notifying a situation by transmitting an SMS notification message to a user terminal of a pre-registered recipient while promptly displaying a warning light and propagating an alarm sound to the outside in an emergency situation, and a system and a method for notifying a rescue signal.

BACKGROUND ART

As the industrial society develops and the importance of the developed technologies increases, the security of storage places of the technologies and data are kept is getting more and more emphasized and the interest in personal security to notify others of urgent situations of individuals is growing.

In consideration of the recent situations,

Various types of alarm devices to only authorized persons into a specific place have been developed and used.

However, the typical alarm device is configured so that the victim recognizing the intruder is required to operate the alarm device to express the emergency situation to the outside in the situation where each abnormal situation occurs. However, in the intruder's intrusion situation or in the condition in which the victim's reorganization ability is insufficient or is in the urgent situation, the victim is not able to operate the alarm device and therefore is still a target of crime.

Korean Laid-Open Patent Application No. 10-2010-97849 discloses a crisis management system that enables a person in a dangerous situation to generate alarms and notify a dangerous situation to surrounding people by a simple operation and enables the surrounding people to be actively involved in relief activities and take countermeasures against the dangerous situation. The crisis management system just provides a notification function to a computer via the Internet and thus is difficult to apply to currently available user terminals.

In addition, CCTV related industry and advanced science equipment for post-management is being continuously developed around the world, but systems for preventing crime signs and distress accidents have not yet been developed.

Accordingly, there is a need to complement and construct a system capable of promptly notifying external management authority servers or user terminals of pre-registered emergency notification recipients of the situations via an SMS notification message while promptly and simply propagating a warning light, an alarm sound, a rescue announcement voice.

DISCLOSURE

Technical Problem

The present invention has been made in view of the above-described circumstances, and an object of the present invention is to provide a system for detecting intrusion in advance using an SMS notification service configured to cognize an intruder through detection by a mobile communication transceiver installed in places requiring security like windows of a company, a government office, a shop, a convenience store, a villa, a rural housing, a detached house, or the like, output an alarm sound, a warning light, a voice alarm, or the like, allow the mobile communication transceiver to automatically transmit position information and an emergency situation to a server, and transmit an SMS notification to a telephone number of a pre-stored security company or an acquaintance.

Another object of the present invention is to provide a system and a method for notifying a rescue signal using an SMS notification service capable of controlling parties to output a warning light, an alarm sound, or a rescue voice through a mobile communication transmitter installed therearound as a rescue signal by a simple button input in urgent situations such as a crime sign and a distress or emergency situation and propagating situation information via the SMS notification service to transmit measures against the emergency situations to a guardian's portable terminal through a management authority server or a mobile communication network.

Objects of the present disclosure are not limited to the above-mentioned objects. That is, other objects that are not mentioned may be obviously understood by those skilled in the art.

SUMMARY OF THE INVENTION

In one general aspect, a system for detecting intrusion in advance using an SMS alarm service, includes: a mobile communication transceiver comprising an intrusion detection unit for detecting an approach of an object within a predetermined distance, a storage unit for storing position information regarding a place at which the mobile communication transceiver is installed, a control unit for controlling the alarm device that receives a detection signal from the intrusion detection unit so as to output an alarm sound and a warning light and generates an intrusion confirmation signal according to the detection signal in order to notify the outside of intrusion and transmits the same to a management server, and a wireless communication unit for transmitting the intrusion confirmation signal to the management server; an alarm device for receiving a control signal from the mobile communication transceiver and outputting the alarm sound and the warning light; a management server for receiving the position information and the intrusion confirmation signal to confirm a pre-stored notification recipient telephone number of a victim from a client information database, and requesting a push server to transmit an SMS notification message, which includes position information regarding the position of the mobile communication transceiver and an emergency contact of the victim, to a user terminal corresponding to each notification recipient telephone number; and a push server for receiving the request from the management server to generate the SMS notification message and transmitting the SMS notification message to the user terminal corresponding to the notification recipient telephone number.

The system may further include: an APP server for receiving a request of the user terminal to provide an application including an intrusion notification, a function of displaying position information of the mobile communication transceiver or an emergency contact of a victim, and a communication connection function, in which the management server may interwork with the application to provide the position information to the notification recipient telephone number or provide the emergency contact of the victim.

The management server may further include: an APP interworking unit for providing an interface that interworks with the application to provide the position information to the notification recipient telephone number or receive the emergency contact information of the victim; a customer information DB for storing customer information including the emergency contact of the victim and at least one notification recipient telephone number; and a position information DB for receiving the position information of the mobile communication transceiver to store the position information for each mobile communication transceiver.

The management server may further include: an SW interworking unit for providing an interface that interworks with software installed in the user terminal in web environment to provide the position information to the notification recipient telephone number or receive the emergency contact of the victim, when the user terminal is a computer.

The intrusion detection unit may detect an object using an infrared signal or a microwave, set residence time of the detected object to determine whether an intruder is intruded, and output the detection signal when the residence time elapses.

In another general aspect, a method for detecting intrusion in advance using an SMS notification service includes: detecting, by a mobile communication transceiver installed in a crime prevention area, an approach of an object within a predetermined distance; controlling an alarm device to receive the detection signal of the intrusion detection unit to output an alarm sound and a warning light; generating an intrusion confirmation signal for notifying an outside of the intrusion according to the detection signal to transmit the generated intrusion confirmation signal to a management server; receiving, by the management server receiving the intrusion confirmation signal, the position information and the intrusion confirmation signal to confirm a pre-stored notification recipient telephone number of a victim from a database and requesting a push server to transmit an SMS notification message, which includes position information regarding a position of the mobile communication transceiver and an emergency contact of the victim, to a user terminal of each notification recipient telephone number; and receiving, by a push server, the request from the management server to generate the SMS notification message and transmitting the SMS notification message to the user terminal corresponding to the notification recipient telephone number.

In still another general aspect, a system for notifying a rescue signal using an SMS notification service includes: a mobile communication transceiver for wirelessly transmitting a rescue signal to a management server connected to an Internet to notify a user terminal of a guardian or a management authority server of an occurrence of emergency situations such as a crime sign and a distress while providing a rescue alarm through a plurality of alarm devices installed in a proper place therearound by receiving a rescue signal of a victim when the emergency situations such as the crime sign and the distress occur; an alarm device for receiving the rescue signal from the mobile communication transceiver to output a warning light and outputting a pre-stored rescue voice or a situation alarm sound through a speaker; a management server for receiving the rescue signal from the mobile communication transceiver to confirm a pre-stored emergency notification recipient telephone number of the victim from a customer information DB and confirm position information of the mobile communication transceiver from a position information DB and requesting the push server to transmit an SMS notification message including the position information and an emergency contact of the victim to the user terminal of each emergency notification recipient telephone number or generating a situation notification message including the position information and the emergency contact and transmitting the generated situation notification message to a management authority server in a wired/wireless communication manner; a push server for receiving a request from the management server to generate the SMS notification message and transmitting the SMS notification message to the management authority server connected to the user terminal corresponding to the emergency notification recipient telephone number or the Internet; and the management authority server for receiving the situation notification message through the Internet.

The management server may receive a unique code from the mobile communication transceiver to confirm the position information of the alarm device.

The system may further include: an APP server for receiving a request of the user terminal to provide an application including an intrusion notification, a function of displaying position information of the mobile communication transceiver or an emergency contact of a victim, and a communication connection function, wherein the management server interworks with the application to provide the position information to the emergency notification recipient telephone number or provide the emergency contact of the victim.

The management server may further include: an APP interworking unit for providing a user interface that interworks with the application to provide the position information to the emergency notification recipient telephone number or receive the emergency contact of the victim; a customer information DB for storing customer information including the emergency contact of the victim and one or more emergency notification recipient telephone number; a position information DB for receiving the unique code and the position information of the mobile communication transceiver to store the position information for each transmitter; and a SW interworking unit for providing an interface that interworks with software for receiving the situation notification messages installed in the management authority server, and generating the situation notification message including the position information and the emergency contact of the victim and transmitting the generated situation notification message to the management authority server and a security company server.

In still another general aspect, a method for notifying a rescue signal using an SMS notification service includes: receiving a rescue signal from a mobile communication transceiver that a victim carries, when emergency situations such as a crime sign and a distress occur; outputting, by a plurality of alarm devices installed in a proper place therearound for receiving the rescue signal from the mobile communication transceiver, a warning light and outputting a pre-stored rescue voice or a situation notification sound through a speaker; wirelessly transmitting the rescue signal to a management server to notify a user terminal of a guardian or a management authority server connected to an Internet of the occurrence of the emergency situations such as the crime sign and the distress; receiving, by a management server, the rescue signal from the mobile communication transceiver to confirm a pre-stored emergency notification recipient telephone number of the victim from a customer information DB and confirm position information of the mobile communication transceiver from a position information DB and requesting a push server to transmit an SMS notification message including the position information and an emergency contact of the victim to the user terminal of each emergency notification recipient telephone number; receiving the request from the management server to generate the SMS notification message and transmitting the SMS notification message to the user terminal of the emergency notification recipient telephone number or the management authority server; and receiving, by the user terminal or the management authority server, the SMS notification message through the push server.

ADVANTAGEOUS EFFECTS

According to the system for detecting intrusion in advance using an SMS notification service and the system and method for notifying a rescue signal according to the present invention, it is possible to automatically recognize an intruder in advance immediately notify the intrusion of the intruder to the outside by the alarm sound, the warning light, the voice alarm, or the like, and transmit the SMS notification message including the victim's position and the emergency contact to the pre-registered telephone number by the mobile communication transceiver, thereby promptly coping with the crime and preventing the accidents.

In addition, the mobile communication transceiver receives the detection signal of the infrared ray or the like which detects an approach of an intruder within a predetermined distance transmits the notification message including the victim's position and the emergency contact to the telephone number of the pre-registered security company employees and business related persons to promptly cope with the intrusion and eliminate the situation room, the wireless command method, and the wired network, thereby more promptly and economically constructing the security system.

In addition, it is possible to derive the economic benefits due to the maintenance manpower and the cost reduction because there is no separate installation work in the existing security systems in addition to the components detecting the infrared rays.

Since anyone can be protected by the security company through such notification service in the emergency situation, the ripple effects can be expected to be great.

Parties can output the warning light and the rescue voice through the mobile communication transceiver installed thereround as the rescue signal only by the simple button input in the distress or emergency situation, and transmit the user terminals of the guardians through the management authority server, the security company server, or the mobile communication network connected to the wired/wireless communication network, thereby confirming the emergency situation or promptly receiving the measure against the confirmed emergency situation.

As another effect, the mobile communication transceiver receives and transmits the rescue signal input by the button operation and transmits the notification message including the victim's position and the emergency contact to the telephone number of the pre-registered security company employees and the business related persons by the above-described method or the situation notification message through the applications to promptly cope with the intrusion and eliminate the situation room and the wireless command method, thereby constructing more promptly and economical security system.

Since anyone can be protected by the security company through such notification service in the emergency situation, the ripple effects can be expected to be great.

DETAILED DESCRIPTION OF THE INVENTION

Hereinafter, exemplary embodiments of the present invention will be described in detail with reference to the accompanying drawings. The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

Therefore, configurations described in exemplary embodiments and the accompanying drawings of the present specification do not represent all of the technical spirits of the present disclosure, but are merely most preferable embodiments. Therefore, the present disclosure should be construed as including all the changes, equivalents, and substitutions included in the spirit and scope of the present disclosure at the time of filing this application.

Hereinafter, a system for detecting intrusion in advance using an SMS notification service according to an embodiment of the present invention will be described in detail.

Figure 1:
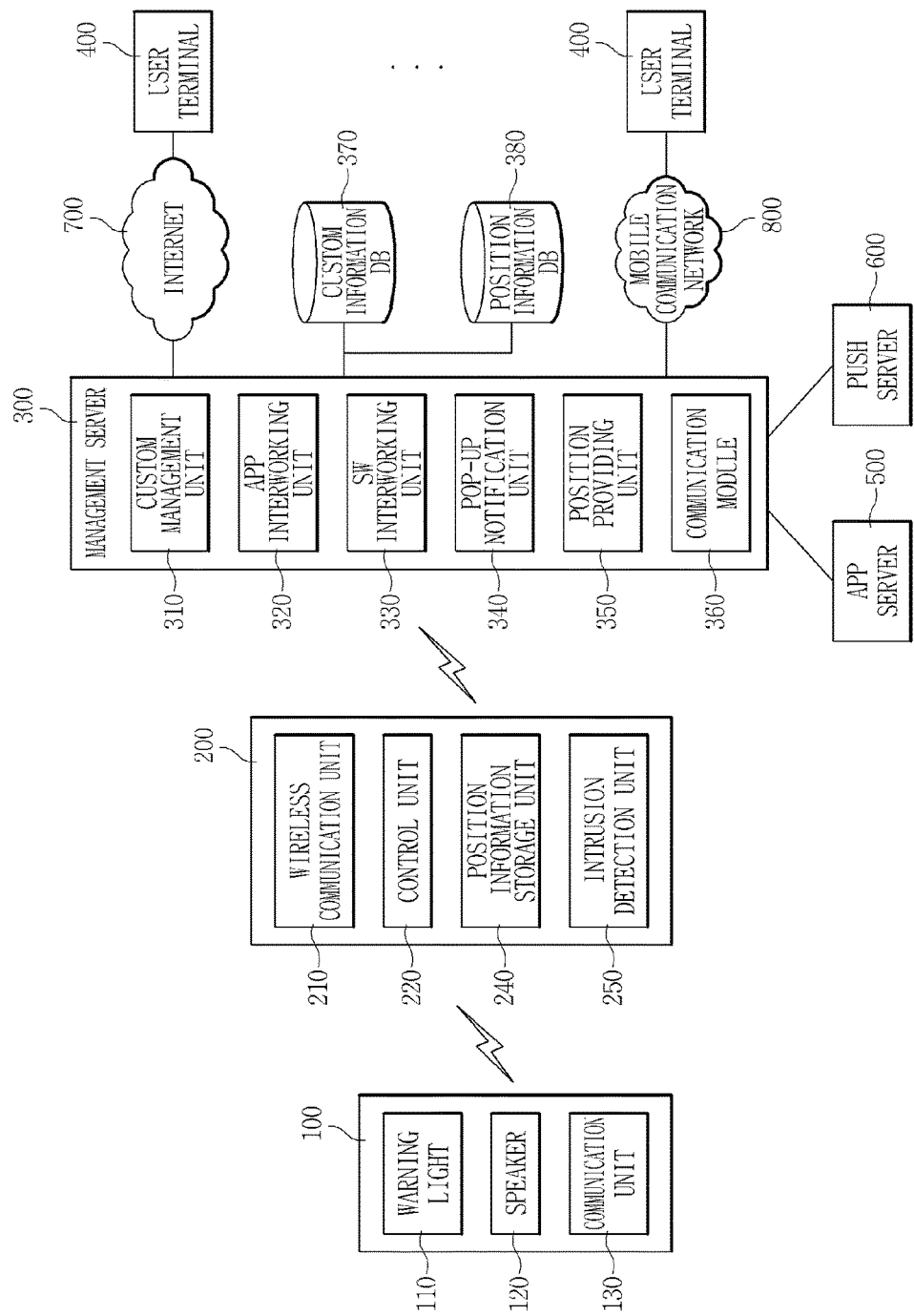
FIG. 1 is a block diagram showing an overall configuration of a system for detecting intrusion in advance using an SMS notification service according to an embodiment of the present invention.

FIG. 1 is a block diagram showing an overall configuration of a system for detecting intrusion in advance using an SMS notification service according to an embodiment of the present invention.

A system for detecting intrusion in advance using an SMS notification service according to an embodiment of the present invention includes an alarm device 100, a mobile communication transceiver 200, a management server 300, a user terminal 400, an APP server 500, and a push server 600.

The mobile communication transceiver 200 includes an intrusion detection unit 250 for detecting an approach of an object within a predetermined distance, a storage unit 240 for storing position information regarding a place at which the mobile communication transceiver 200 is installed, a control unit 220 for controlling the alarm device 100 that receives a detection signal from the intrusion detection unit 250 to output an alarm sound and a warning light 110 and generates an intrusion confirmation signal according to the detection signal to notify the outside of intrusion and transmits the same to a management server 300, and a wireless communication unit 210 for transmitting the intrusion confirmation signal to the management server 300.

Further, the intrusion detection unit 250 detects the object using an infrared signal or a microwave, sets residence time of the detected object to determine whether an intruder is intruded, and outputs the detection signal when the residence time elapses.

The alarm device 100 serves to receive a control signal of the mobile communication transceiver 200 through the communication unit 130 and output the alarm sound and the warning light 110 through the speaker 120 and may further include a power supplier (not illustrated) to receive separate power.

The management server 300 receives the position information and the intrusion confirmation signal to confirm a pre-stored notification recipient telephone number of a victim from a client information database, and requests a push server to transmit an SMS notification message, which includes position information regarding the position of the mobile communication transceiver 200 and an emergency contact of the victim, to a user terminal 400 corresponding to each notification recipient telephone number. Here, the notification recipient may be, for example, a victim's family member, a relative, an acquaintance, a customer center of a police agency, or security company employee, but the present invention is not limited thereto.

The push server 600 receives the request from the management server 300 to generate the SMS notification message and transmits the SMS notification message to the user terminal 400 corresponding to the notification recipient telephone number.

The user terminal 400 may receive the SMS notification message to confirm the position of the victim and get in touch with the emergency contact, thereby taking prompt action. Here, the user terminal 400 may be a user terminal capable of receiving a push alarm (SMS pop-up notification message) from the push server 600 through the mobile communication network 800, and may be a smart phone, a CDMA mobile phone, a phablet phone, or the like.

Meanwhile, the APP server 500 for receiving the request of the user terminal 400 to provide an application and providing an application including an intrusion notification, a function of displaying the position information of the mobile communication transceiver 200 or the emergency contact of the victim, and a communication connection function may be provided.

At this time, the management server 300 interworks with the application to provide the position information of the mobile communication transceiver 200 to the notification recipient telephone number or provide the emergency contact of the victim.

In addition, the management server 300 further includes an APP interworking unit 320 for providing an interface that interworks with the application to provide the position information to the notification recipient telephone number or receive the emergency contact information of the victim, a customer information DB 370 for storing customer information including the emergency contact of the victim and at least one notification recipient telephone number, and a position information DB 380 for receiving the position information of the mobile communication transceiver 200 to store the position information for each mobile communication transceiver 200.

In addition, the management server 300 may further include an SW interworking unit 330 for providing program that interworks with intrusion notification software installed in the user terminal 400 in internet 700 environment such as LAN to provide the position information to the notification recipient telephone number or receive the emergency contact of the victim, when the user terminal 400 corresponds to a desktop computer, a notebook computer, and a tablet computer that use operating systems such as windows and Linux.

In addition, the management server 300 includes a customer management unit 310 for receiving the customer information from the customer information DB 370 and providing the same to the pop-up notification unit 340 to provide a pop-up notification to the emergency contact of the victim and the notification recipient phone number, a pop-up notification unit 340 for receiving the customer information from the customer management unit 310 and the position information from the position providing unit 350 to request the push server 600 to transmit the SMS notification message, a position providing unit 350 for confirming the pre-stored position information of the mobile communication transceiver 200 from the position information DB 380 and providing the corresponding position information to the pop-up notification unit 340, and a communication module 360 for providing a communication protocol by which the mobile communication transceiver 200 can communicate with the wireless communication and the user terminal 400.

Figure 2:
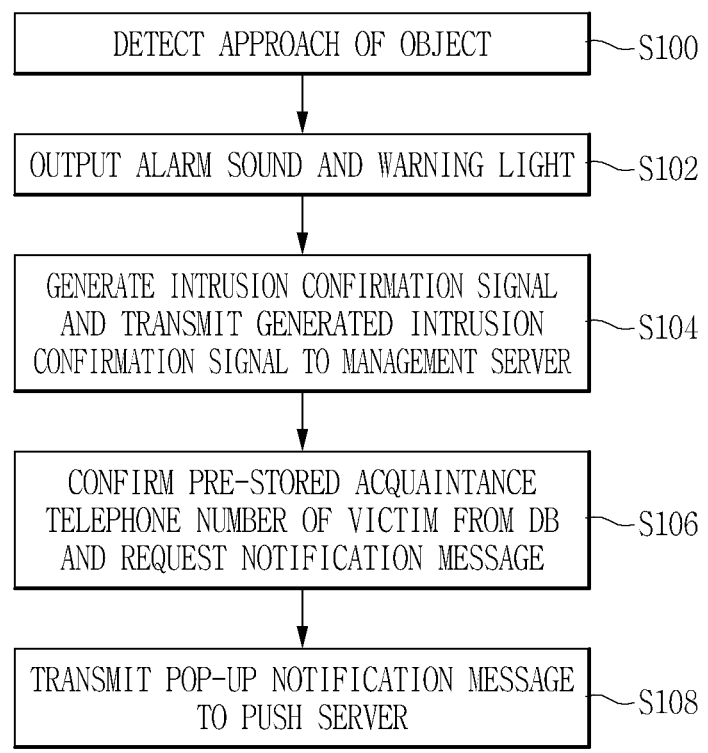
FIG. 2 is a flow chart illustrating a method for detecting intrusion in advance using an SMS notification service according to an embodiment of the present invention.

FIG. 2 is a flow chart illustrating a method for detecting intrusion in advance using an SMS notification service according to an embodiment of the present invention.

First, the mobile communication transceiver 200 installed in a crime prevention area detects an approach of an object within a predetermined distance (S100).

Next, as the alarm device 100 is controlled to receive the detection signal of the intrusion detection unit 250 to output the alarm sound and the warning light 110, the alarm device 100 outputs the alarm sound and the warning light 110 to notify the surrounding people of the intrusion (S102).

The manager server 300 generates the intrusion confirmation signal for notifying the outside of the intrusion according to the detection signal and transmits the same to the management server (S104).

The management server 300 receiving the intrusion confirmation signal receives the position information and the intrusion confirmation signal to confirm a pre-stored notification recipient telephone number of a victim from a client information database, and requests a push server to transmit an SMS notification message, which includes position information regarding the position of the mobile communication transceiver 200 and an emergency contact of the victim, to a user terminal 400 corresponding to each notification recipient telephone number (S106).

The push server 600 receives the request from the management server to generate the SMS notification message and transmits the SMS notification message to the user terminal 400 corresponding to the notification recipient telephone number (S108).

Figure 3:
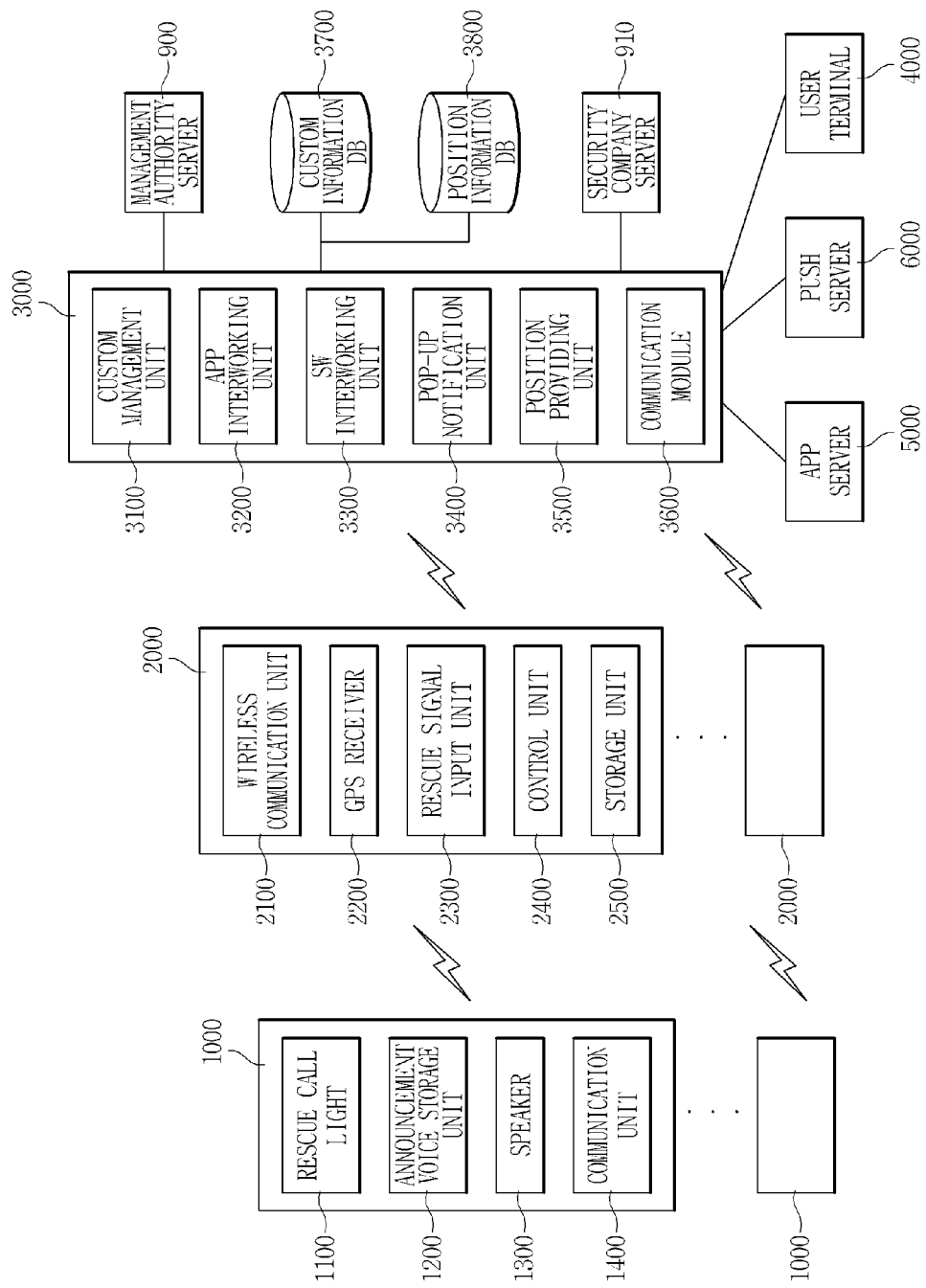
FIG. 3 is a block diagram of a system for notifying a rescue signal using an SMS notification service according to another embodiment of the present invention.

FIG. 3 is a block diagram of a system for notifying a rescue signal using an SMS notification service according to another embodiment of the present invention.

A system for notifying a rescue signal using an SMS notification service according to another embodiment of the present invention includes an alarm device 1000, a mobile communication transceiver 2000, a management server 3000, a user terminal 4000, an APP server 5000, a push server 6000, and a management authority server 900.

When emergency situations such as a crime sign and a distress occur, the mobile communication transceiver 2000 for wirelessly transmitting a rescue signal to the management server 3000 connected in a wireless communication manner through the wireless communication unit 2100 to notify the user terminal 4000 of the guardian or the management authority server 900 of the occurrence of the emergency situations such as the crime sign and the distress while providing the rescue alarm through a plurality of alarm devices 1000 installed in a proper place therearound by receiving the rescue signal of the victim when the emergency situations of the crime sign or the distress occur.

In addition, the mobile communication transceiver 2000 further includes a control unit 2400 for performing a control to transmit an inherent code and position information of the mobile communication transceiver 2000 to the alarm device 1000 and the management server 3000 when receiving the rescue signal of the victim, a rescue signal input unit 2300 for transmitting the rescue signal input from an outside in an emergency situation to the control unit, and a storage unit 2500 for storing the position information or the rescue signal. It is preferable that the mobile communication transceiver 2000 equipped with the rescue signal input unit 2300 is made compact and is manufactured to be easily carried.

The alarm device 1000 outputs a warning light 1100 after a communication unit 1300 receives the rescue signal transmitted from the wireless communication unit 2100 of the mobile communication transceiver 2000 and outputs a pre-stored rescue voice or a situation alarm sound through a speaker. It is preferable that the alarm device 1000 are provided in plural to be spaced apart from each other in a proper place in a range in which they can communicate with the mobile communication transceiver 2000 so that outsiders can easily recognize an emergency situation. Furthermore, the alarm device 10000 may include a rescue voice storage unit 1400 for storing the rescue voice. The alarm device may be manufactured to include a warning light for lighting and a speaker for outputting a situation alarm sound.

The management server 3000 receives the rescue signal from the mobile communication transceiver 2000 to confirm a pre-stored emergency notification recipient telephone number of the victim from a customer information DB 3700 and confirm the position information of the mobile communication transceiver 2000 from a position information DB 3800, and requests the push server 6000 to transmit an SMS notification message including the position information and the emergency contact of the victim to a user terminal 4000 of each emergency notification recipient telephone number. Here, the emergency notification recipient may correspond to, for example, a victim's family member, an acquaintance, a pre-registered security company employee, or a management authority (customer center of a police agency).

Furthermore, the management server 3000 preferably receives a unique code from the mobile communication transceiver 2000 to confirm the position information of the mobile communication transceiver 2000. Here, the unique code may correspond to unique identification information that can be identified for the mobile communication transceiver 2000.

The management server 3000 may use the received unique code of the mobile communication transceiver 2000 from the position information DB 3800 to search position information of the corresponding mobile communication transceiver 2000 and inquire the customer information associated with the corresponding victim receiving the rescue signal.

The push server 6000 receives the request from the management server 3000 to generate the SMS notification message and transmits the SMS notification message to the management authority server 4000 connected to the user terminal 4000 of the emergency notification recipient telephone number or the Internet.

The user terminal 4000 receives the SMS notification message through the push server 6000. Here, the user terminal 4000 may be a terminal capable of receiving the SMS notification message, and may be, for example, a CDMA mobile phone, a smart phone, a phablet phone, or the like. In addition, the user terminal 4000 may be a desktop computer, a notebook computer, an ultra mobile PC, or a tablet PC in which an application capable of receiving a text message notification, a telephone call or the like through the Internet telephone service or the like such as VOIP on the Internet communication can be installed.

The management authority server 900 is a server capable of coping with the emergency situations such as a crime sign and a distress and can designate an installation place according to a management method by a server, and can receive the situation notification message including the position information and the emergency contact of the victim to promptly confirm the emergency situation.

The security company server 910 is a server positioned in a private security agency and promptly receives the situation notification message from the management server 3000 receiving the rescue signal by communication to confirm the position at which the emergency situation occurs and promptly take measures such as getting in touch with the emergency contact.

Meanwhile, the APP server 5000 for receiving the request of the user terminal 4000 to provide an application including an intrusion notification, a function of displaying the position information of the mobile communication transceiver 2000 or the emergency contact of the victim, and a communication connection function may be provided.

The management server 3000 may interwork with the application to provide the position information to the emergency notification recipient telephone number or provide the emergency contact of the victim.

In addition, the management server 3000 further includes a client management unit 3100, an APP interworking unit 3200, a SW interworking unit 3300, a pop-up notification unit 3400, a position providing unit 3500, a communication module 3600, a customer information DB 3700, and a position information DB 3800.

The APP interworking unit 3200 may provide a user interface that interworks with the application to provide the position information to the emergency notification recipient telephone number or receive the emergency contact of the victim.

The customer information DB 3700 stores the customer information including the emergency contact of the victim and one or more emergency notification recipient telephone number.

The position information DB 3800 receives the unique code and the position information of the mobile communication transceiver 2000 to store the position information for each transmitter.

The customer management unit 3100 receives the customer information from the customer information DB 3700 and provides the same to the pop-up notification unit 3400 to provide an SMS pop-up notification to the emergency contact of the victim and the notification recipient phone number.

The pop-up notification unit 3400 receives the customer information from the customer management unit 3100 and the position information from the position providing unit 3500 from the customer management unit 3100 to request the push server 6000 to transmit the SMS notification message.

The position providing unit 3500 confirms the pre-stored position information of the mobile communication transceiver 2000 from the position information DB 3800 and provides the corresponding position information to the pop-up notifying unit 3400.

The communication module 3600 provides a communication protocol capable of wirelessly communicating with the mobile communication transceiver 2000 or communicating with the user terminal 4000 through the mobile communication network and communicating with the management authority server 900 and the security company server 910 in a wired/wireless communication manner.

The SW interworking unit 3300 provides an interface for interworking with the software for receiving the situation notification messages installed in the management authority server 900 and the security company server 910, and generates the situation notification message including the position information and the emergency contact of the victim and transmits the same to the management authority server 900 and the security company server 910.

Figure 4:
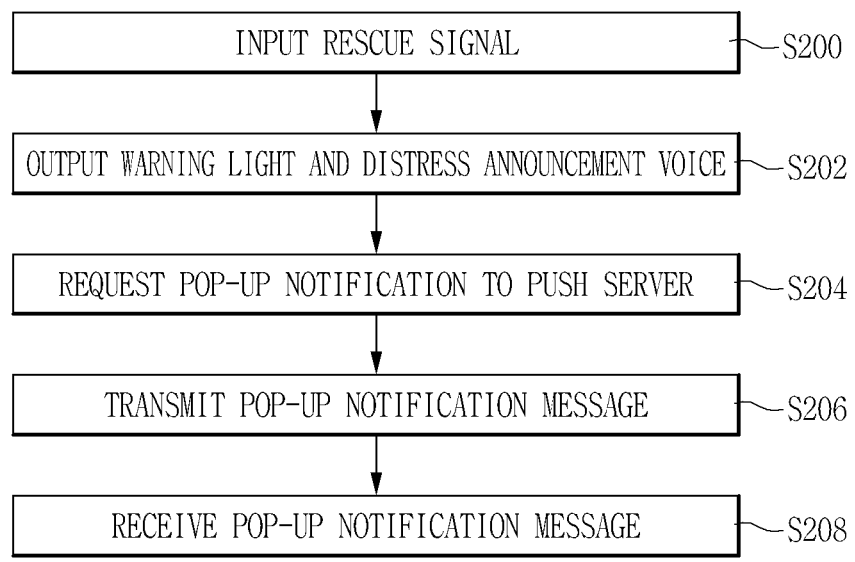
FIG. 4 is a flow chart of a method for notifying a rescue signal using an SMS notification service according to another embodiment of the present invention.

FIG. 4 is a flow chart of a method for notifying a rescue signal using an SMS notification service according to another embodiment of the present invention.

First, when the emergency situations such as a crime sign and a distress occur, the rescue signal is input from the mobile communication transceiver 2000 that the victim carries (S200).

Thereafter, the plurality of alarm devices 1000 installed in a proper place therearound for receiving the rescue signal from the mobile communication transceiver 2000 output the warning light 1100 and output the pre-stored rescue voice or situation notification sound through the speaker (S202), and wirelessly transmits the rescue signal to the management server 3000 to notify the user terminal 4000 of the guardian or the management authority server 900 connected to the Internet of the occurrence of the emergency situations such as a crime sign and a distress.

The management server 3000 receives the rescue signal from the mobile communication transceiver 2000 to confirm a pre-stored emergency notification recipient telephone number of the victim from a customer information DB 3700 and confirm the position information of the mobile communication transceiver 2000 from a position information DB 3800, and requests the push server 6000 to transmit an SMS notification message including the position information and the emergency contact of the victim to a user terminal 4000 of each emergency notification recipient telephone number (S204).

The push server 6000 receives the request from the management server 3000 to generate the SMS notification message and transmits the SMS notification message to the user terminal 4000 of the emergency notification recipient telephone number or the management authority server 900 (S206).

The user terminal 4000 or the management authority server 4000 receives the SMS notification message through the push server 6000 (S208).

DETAILED DESCRIPTION OF MAIN ELEMENTS 100, 1000: Alarm device 110, 1100: Warning light
120, 1200: Speaker 130, 1300: Communication unit
1400: Rescue voice storage unit
200, 2000: Mobile communication transceiver 210, 2100: Wireless communication unit
220, 2400: Control unit 2300: Rescue signal input unit
240, 2500: Storage unit 250: Intrusion detection unit
300, 3000: Management server 310, 3100: Customer management unit
320, 3200: APP interworking unit 330, 3300: SW interworking unit
340, 3400: Pop-up notification unit 350, 3500: Position providing unit
360, 3600: Communication module 370, 3700: Customer information DB
380, 3800: Position information DB 400, 4000: User terminal
500, 5000: APP server 600, 6000: Push server
700: Internet 800: Mobile communication network
900: Management authority server 910: Security company server

INDUSTRIAL APPLICABILITY

The present invention provides a system for detecting intrusion in advance using an SMS notification service capable of promptly notifying a situation by promptly displaying a warning light in an emergency situation, propagating an alarm sound to the outside, and transmitting an SMS notification message to a user terminal of a pre-registered recipient, and a system and a method for notifying a rescue signal, and can be used for fields such as a security system and mobile communication.

The invention claimed is:

1. A system for notifying a rescue signal using an SMS notification service, comprising:
    a mobile communication transceiver for wirelessly transmitting the rescue signal to a management server through a mobile communication network connected to notify a user terminal of a pre-stored emergency notification recipient telephone number or a management authority server of an occurrence of an emergency situation of a crime sign or a distress while providing a rescue alarm through a plurality of alarm devices installed in a place therearound when the emergency situation of the crime sign or the distress occurs; and
    an alarm device for receiving the rescue signal from the mobile communication transceiver to output a warning light and outputting a pre-stored rescue voice or a situation alarm sound through a speaker,
    wherein the management server is configured for receiving the rescue signal with a unique code from the mobile communication transceiver to confirm the pre-stored emergency notification recipient telephone number of a victim from a customer information DB and confirm position information of the mobile communication transceiver from a position information DB and requesting a push server to transmit an SMS notification message including the position information and an emergency contact of the victim to the user terminal of the pre-stored emergency notification recipient telephone number or generating a situation notification message including the position information and the emergency contact and transmitting the generated situation notification message to the management authority server in a wired/wireless communication manner, and
    wherein the push server is configured for receiving a request from the management server to generate the SMS notification message and transmitting the SMS notification message through the mobile communication network to the management authority server or to the user terminal of the pre-stored emergency notification recipient telephone number.

2. The system of claim 1, further comprising:
an APP server for receiving a request of the user terminal to provide an application including an intrusion notification, a function of displaying the position information of the mobile communication transceiver or the emergency contact of the victim, and a communication connection function, wherein the management server interworks with the application to provide the position information to the pre-stored emergency notification recipient telephone number or provide the emergency contact of the victim.

3. The system of claim 2, wherein the management server further includes:
an APP interworking unit for providing a user interface that interworks with the application to provide the position information to the emergency notification recipient telephone number or receive the emergency contact of the victim;
the customer information DB for storing customer information including the emergency contact of the victim and one or more emergency notification recipient telephone numbers;
the position information DB for receiving the unique code and the position information of the mobile communication transceiver to store the position information for each transmitter; and
a SW interworking unit for providing an interface that interworks with software for receiving the situation notification message installed in the management authority server, and generating the situation notification message including the position information and the emergency contact of the victim and transmitting the generated situation notification message to the management authority server and a security company server.

4. A method for notifying a rescue signal using an SMS notification service, comprising:
receiving the rescue signal from a mobile communication transceiver that a victim carries, when an emergency situation of a crime sign or a distress occurs;
outputting, by a plurality of alarm devices installed in a place therearound for receiving the rescue signal from the mobile communication transceiver, a warning light and outputting a pre-stored rescue voice or a situation notification sound through a speaker;
wirelessly transmitting the rescue signal with a unique code by the mobile communication transceiver to a management server through a mobile communication network to notify a user terminal of a pre-stored emergency notification recipient telephone number or a management authority server connected to an Internet of the occurrence of the emergency situation of the crime sign or the distress;
receiving, by the management server, the rescue signal from the mobile communication transceiver to confirm the pre-stored emergency notification recipient telephone number of the victim from a customer information DB and confirm position information of the mobile communication transceiver from a position information DB and requesting a push server to transmit an SMS notification message including the position information and an emergency contact of the victim to the user terminal of the pre-stored emergency notification recipient telephone number;
receiving a request from the management server to generate the SMS notification message and transmitting the SMS notification message through the mobile communication network to the user terminal of the pre-stored emergency notification recipient telephone number or the management authority server; and
receiving, by the user terminal or the management authority server, the SMS notification message through the push server.

* * * * *